US007729320B2

(12) United States Patent
Sawada

(10) Patent No.: US 7,729,320 B2
(45) Date of Patent: Jun. 1, 2010

(54) MOBILE RADIO SYSTEM AND MOBILE RADIO CONTROL METHOD

(75) Inventor: Kensuke Sawada, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 869 days.

(21) Appl. No.: 11/598,683

(22) Filed: Nov. 14, 2006

(65) Prior Publication Data
US 2007/0135115 A1   Jun. 14, 2007

(30) Foreign Application Priority Data
Dec. 9, 2005   (JP)   ............................. 2005-356274

(51) Int. Cl.
*H04B 7/212* (2006.01)
(52) U.S. Cl. .................. 370/337; 370/344; 370/280; 455/452.1
(58) Field of Classification Search ................. 370/337, 370/344, 280; 455/452.1
See application file for complete search history.

(56) References Cited

U.S. PATENT DOCUMENTS

| 7,369,565 | B2 * | 5/2008 | Lee et al. ................... 370/412 |
| 7,519,112 | B2 * | 4/2009 | Ives et al. ................... 375/224 |
| 2002/0058518 | A1 | 5/2002 | Mitsugi |
| 2002/0136172 | A1 | 9/2002 | Chun et al. |
| 2003/0086401 | A1 * | 5/2003 | Lee et al. ................... 370/337 |
| 2004/0047307 | A1 | 3/2004 | Yoon et al. |
| 2004/0147272 | A1 | 7/2004 | Shiota et al. |
| 2005/0008040 | A1 * | 1/2005 | Becker et al. ............... 370/503 |
| 2005/0215276 | A1 * | 9/2005 | Koo et al. ................... 455/522 |
| 2006/0105773 | A1 * | 5/2006 | Lin et al. ................. 455/452.1 |
| 2007/0110106 | A1 * | 5/2007 | Becker et al. ............... 370/503 |

FOREIGN PATENT DOCUMENTS

WO   WO 99/65163   12/1999

OTHER PUBLICATIONS

Extended European Search Report, mailed Mar. 29, 2007 and issued in corresponding European Patent Application No. 06124854.8-1246.

* cited by examiner

*Primary Examiner*—Danh C Le
(74) *Attorney, Agent, or Firm*—Staas & Halsey LLP

(57) ABSTRACT

A mobile station enables communication with a fixed station and other mobile stations. The mobile station includes a receiving unit receiving first timing information, second timing information and reliability information with regard to the second timing information. A selector selects a timing, to be used for communication timing with the fixed station or the other mobile stations, between the first timing information and the second timing information based on the reliability information.

4 Claims, 2 Drawing Sheets

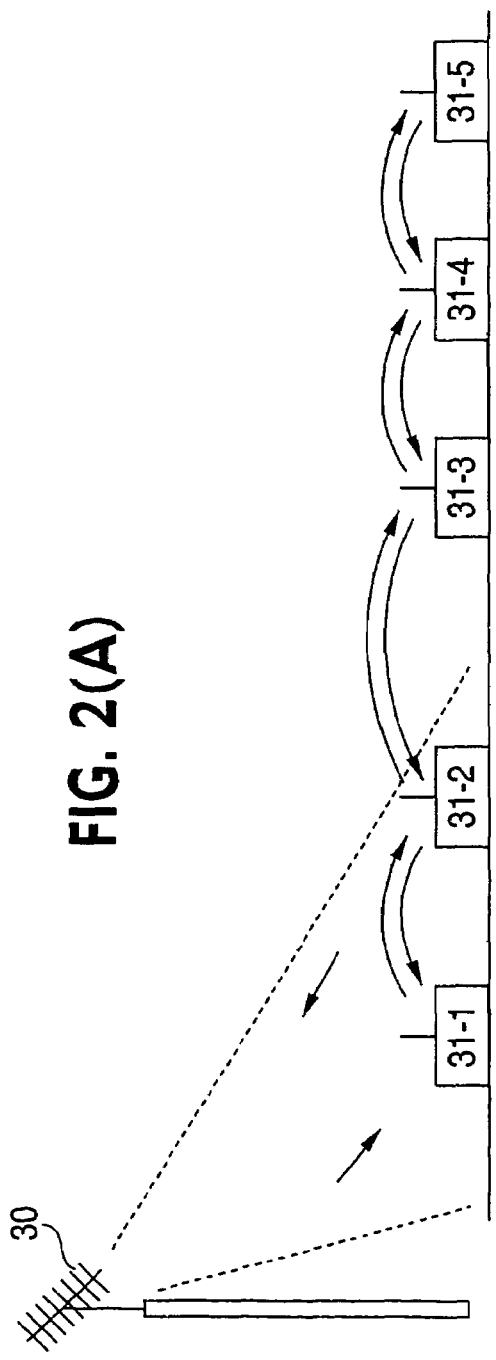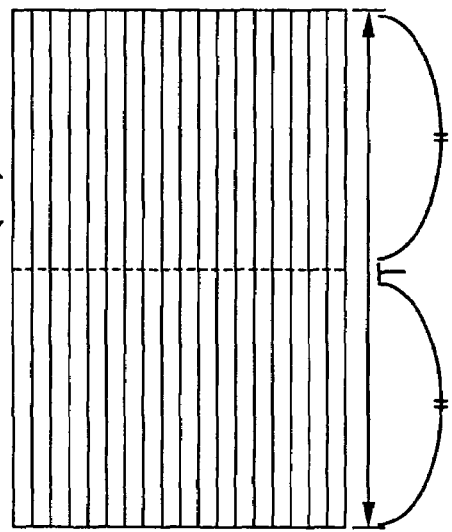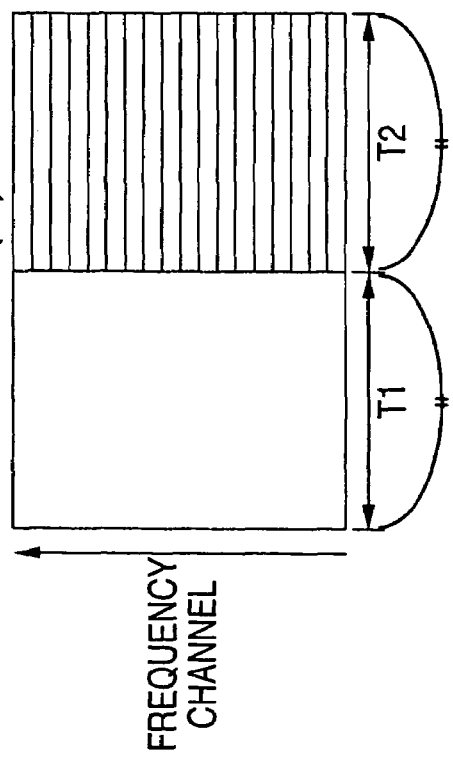

MOBILE RADIO SYSTEM AND MOBILE RADIO CONTROL METHOD

CROSS-REFERENCE TO RELATED APPLICATIONS

This application is related to and claims priority to Japanese Application No. 2005-356274 filed Dec. 9, 2005 in the Japanese Patent Office, the contents of which are incorporated by reference herein.

BACKGROUND OF THE INVENTION

1. Field of the Invention

The present invention relates to a mobile radio system and a mobile radio control method for effectively executing radio communications among mobile stations and radio communications between a fixed station and the mobile stations. Preferably, the mobile stations are provided with a terminal such as a personal computer or the like.

2. Description of the Related Art

A variety of communication systems are already known and various multiplexing communication systems have been proposed with requirements for large capacity transmission. For example, TDMA (Time Division Multiple Access), FDMA (Frequency Division Multiple Access), CSMA (Carrier Sense Multiple Access), and CDMA (Code Division Multiple Access) or the like are known and are also applied to radio communications. Moreover, a system formed by combining these multiplexing communications is also known for realizing radio communications among many mobile stations or between a fixed station and a plurality of mobile stations.

Moreover, in a mobile phone system, a plurality of base stations are distributed for arrangement to partially provide overlapped service areas, enabling communications with the other mobile phones or fixed phones, while a user carrying a mobile phone is moving, and assigning the channels to each mobile phone from the base station side. Moreover, a control method has also been proposed, in which a mobile station issues a channel assignment request to a fixed station with a CSMA/CA system from a mobile station using the common channel. The fixed station executes the scheduling of transmission time based on the TDMA system. (For example, refer to Japanese published patent application JP-A No. 2002-374265). Moreover, a system and a control method enabling the ensuring of bandwidth have also been proposed (for example, refer to Japanese published patent application No. 2005-73240). In this system, a beacon region for transmitting respective beacon packets from a plurality of master stations (fixed stations), a TDMA region for using the band in which the permitted particular station is assigned on the time division basis, and a CSMA region enabling the access through competition are periodically divided on the time axis, and region selection is conducted.

For radio communication on a 1:1 basis by a plurality of mobile stations, assignment of communication channels is required to avoid mutual interference within the predetermined frequency band in which a plurality of communication channels are set. When each fixed station (base stations) is provided for each area to cover almost every service area as in the case of a mobile phone system, assignment of communication channels may be controlled for mobile stations (mobile phones) on the side of the fixed station (base station), but when a plurality of fixed stations are distributed to places of interest along the roads or the like, or when fixed stations defining an event area as the service area are allocated, if a mobile station does not move to the service area (hot spot) of such fixed station, it is impossible to enjoy the communication channel assignment service. Therefore, a system for self-controllably selecting the communication channel to avoid mutual interference by introducing the CSMA system can be adapted for radio communication among the mobile stations.

Moreover, it is also possible to use a CSMA system as a multiple connection system among mobile stations and a TDD (Time Division Duplex) system as a multiplex system of radio communications between a mobile station and a fixed station. In such radio communication systems, when a mobile station comes close to the fixed station, the transmission timing of the mobile station is determined in accordance with the TDD slot timing, and when a mobile station makes communication with the fixed station, the TDD slot timing is synchronized. However, if the fixed station does not exist in the area near a mobile station, the mobile station is required to continuously maintain a timing to be self-controllably synchronized with the fixed station, unlike the cellular radio system in which the slot timing signal can be acquired from the fixed station.

Accordingly, it is also considered to adapt a means for acquiring synchronization by obtaining accurate time information based on the GPS (Global Positioning System) for the slot synchronization, but continuous reception of radio waves from the four or more GPS satellites is always required in order to continuously acquire time information by receiving the radio wave from the GPS satellite. However, it is difficult for a mobile station, in the area wherein the radio wave receiving state from a GPS satellite is not so good, to obtain time information through radio wave reception from a GPS satellite. Therefore, continuation of self-controllable synchronization becomes difficult in some cases. Moreover, when the fixed station does not exist at an area near mobile stations, and the radio wave receiving state from a GPS satellite is rather bad, it is possible to realize radio communications with a CSMA system among the mobile stations. However, for realization of highly efficient radio communication by equalizing, in accordance with the TDD system, the slot time length of the time slot used in the CSMA system to the slot time of the time slot designated with the TDD slot timing used by the fixed station, slot synchronization must be continuously attained by receiving the radio wave from the GPS satellite and then obtaining the accurate time information. In this case, a mobile station often faces, as explained above, difficulty in obtaining the time information by always seizing four or more GPS satellites. Therefore, there arises a problem that continuous acquiring of accurate slot synchronization becomes difficult, resulting in interference on radio communications of the other mobile stations.

SUMMARY OF THE INVENTION

In one aspect, the present invention solves the problems explained above and by enabling, among mobile stations, transmission of time information with the addition of reliability information thereto and by realizing continuation of high precision synchronization.

The mobile radio system according to one aspect of the present invention, is a mobile radio system for controlling a radio communication time period between a fixed station and a plurality of mobile stations and a radio communication time period among mobile stations in accordance with a TDD system. The fixed station and a mobile station are respectively provided with time information acquiring means for acquiring the external high precision time information, transmission timing generating means for generating a transmission timing signal in accordance with the TDD system from the time information acquired by the time information acquiring means, a counter conducting a count-up operation with a period of at least the transmission timing signal and being reset when the time information is acquired by the time information acquiring means, sub-information transmitting/receiving means for transmitting sub-information in which the transmission timing signal generated by the transmission timing generating means is defined as internal timing signal and the count value of the counter is defined as an internal count value, and for receiving sub-information in which the transmission timing signal of another station is defined as an external timing signal and the count value of the counter of another station is defined as an external count value, and TDD transmitting/receiving control means for controlling the internal timing signal and the external timing signal with one of the timing signals being selected based on a comparison of the internal count value and the external count value.

Moreover, there is further provided a comparing means for comparing the internal count value with the external count value, the TDD transmitting/receiving control means for selecting, with the comparing means, the internal timing signal when the internal count value is smaller than the external count value, and the external timing signal when the external count value is smaller than the internal count value, and a main information transmitting/receiving means which is controlled in the timing with the TDD transmitting/receiving control means.

The mobile radio control method according to one aspect of the present invention is a mobile radio control method for controlling a radio communication time period between a fixed station and a plurality of mobile stations and a radio communication time period among mobile stations in accordance with the TDD system, comprising that both the fixed station and the mobile station acquire the same external high precision time information to generate the transmission timing signal and reset the counter for counting operation with at least the transmission timing signal period when the time information is acquired, and defining the count value of the counter as internal count value, the transmission timing signal generated from the time information is defined as internal timing signal, and transmitting the internal count value and the internal timing signal with the sub-information, and receiving external count value and external timing signal with sub-information, and comparing the internal count value with the external count value, and selecting the timing signal corresponding to the smaller count value.

The method also includes switching over the communication period in accordance with the CSMA system among the mobile stations and the communication period between the fixed station and the mobile stations on the basis of the TDD system synchronized with the transmission-timing signal.

BRIEF DESCRIPTION OF THE DRAWINGS

FIGS. 2(A), 2(B), 2(C) are explanatory diagrams for time information transfer and communication period switching.

DETAILED DESCRIPTION OF THE PREFERRED EMBODIMENTS

Figure 1:
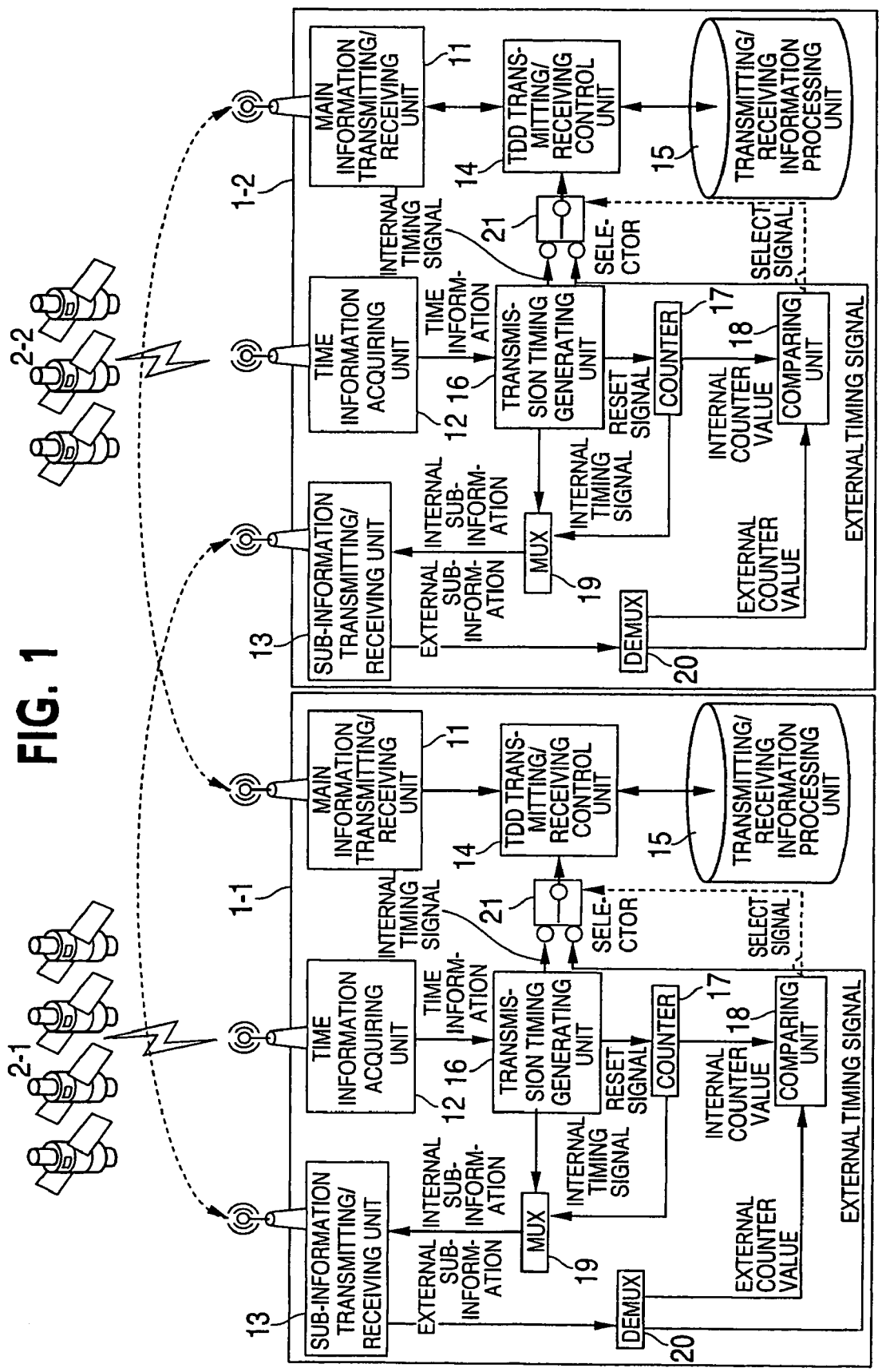
FIG. 1 is an explanatory diagram of the first embodiment of the present invention.

Referring to FIG. 1, the mobile ratio system of one embodiment is a mobile radio system for controlling a radio communication period between a fixed station and a plurality of mobile stations, and a communication period among the mobile stations in accordance with a TDD system. The fixed station and the mobile stations comprise a time information acquiring unit 12 which acts as a means for acquiring high precision time information through a GPS satellite group. A transmission timing generating unit 16 acts as a means for generating a transmission timing signal based on the TDD system from the time information acquired with the time information acquiring unit 12. A counter 17 counts up according to each transmission timing signal and is reset when time information is acquired with the time information acquiring unit 12. A sub-information transmitting/receiving unit 13 acts as a means for transmitting sub-information in which the transmission timing signal generated with the transmission timing generating unit 16 is defined as the internal timing signal, and the count value of the counter 17 is defined as the internal count value. The sub-information transmitting/receiving unit 13 receives the sub-information in which the transmission timing signal of another station is defined as an external (another mobile station) timing signal, and the count value of the counter of another station is defined as an external (another mobile station) count value. A TDD transmitting/receiving control unit 14 acts as a means for realizing control in accordance with the TDD system with the timing signal selected through the comparison between the internal timing signal and the external timing signal with a comparing unit 18 which acts as a means for comparing the value of the internal count value and the external count value.

The mobile radio control method of one embodiment is a mobile radio control method for controlling a radio communication time period between a fixed station and a plurality of mobile stations, and a radio communication time period among mobile stations in accordance with a TDD system. High precision time information is acquired with a GPS satellite group to generate a transmission timing signal. A counter 17 counts up according to each transmission timing signal and is reset when the time information is acquired. The count value of the counter 17 is defined as the internal count value, and the transmission timing signal generated from the time information is defined as the internal timing signal. The internal count value and the internal timing signal are transmitted using the sub-information, the external count value and the external timing signal are received using the sub-information, the internal count value is compared with the external count value with the comparing unit 18, and the timing signal corresponding to the smaller count value is selected to control the TDD transmitting/receiving control unit 14. In FIG. 1, numerals 1-1, 1-2 denote a mobile station, 2-1, 2-2 denote a GPS satellite group, and a fixed station is not illustrated. Moreover, the mobile stations 1-1, 1-2 have the identical structure and like reference numerals denote like elements. In FIG. 1, 11 is a main information transmitting/receiving unit, 12, a time information acquiring unit, 13, a sub-information transmitting/receiving unit, 14, a TDD transmitting/receiving control unit, 15, a transmitting/receiving information processing unit, 16, a transmission timing generating unit, 17, a counter, 18, a comparing unit, 19, a multiplexing unit (MUX), 20, a demultiplexing unit (DEMUX), and 21, a selector.

The time information acquiring unit 12 of each mobile station has an arithmetic processing function and acts as a means for acquiring high precision time information by seizing the GPS satellite group. The mobile station 1-1 is capable of seizing the four GPS satellite groups 2-1 and the mobile station 1-2 can seize, for example, only three GPS satellite groups 2-2. Accordingly, the mobile station 1-1 can acquire high precision time information, but the mobile station 1-2 cannot acquire the high precision time information. In the mobile station 1-1, the time information acquired with the time information acquiring unit 12 is transferred to the transmission timing generating unit 16. The transmission timing generating unit 16 acts as a means for generating the transmission timing signal based on the time information, transfers this transmission timing signal to the selector 21 and multiplexing unit 19 as the internal timing signal, and adds the reset signal outputted with generation of the transmission timing signal to the counter 17.

The counter 17 counts up a clock signal from a clock generator (not illustrated) and resets a count value with a reset signal. The period of the clock signal can be equalized to the transmission timing signal period. The counter 17 is reset with the reset signal when the transmission timing signal is outputted from the transmission timing generating unit 16 on the basis of the time information acquired with the time information acquiring unit 12. When the transmission timing signal cannot be outputted on the basis of the time information, the counting-up operation of the counter 17 is continued. The transmission timing generating unit 16 may be constituted to generate the periodical transmission timing signal under the self-operating state when the time information cannot be acquired from the time information acquiring unit 12. In this case, it can be formed so as not to output the reset signal to the counter 17. Therefore, the count value of the counter 17 when the time information is acquired through reception of the radio wave from the GPS satellite group becomes zero (0) and the count value becomes equal to the value counted, when the transmission timing signal cannot be acquired. The count value of the counter 17 is transferred, as the internal count value, to the comparing unit 18 and the multiplexing unit 19. The count value of the counter 17 acts as the likelihood degree information (reliability information) of the transmission timing signal namely information which shows a degree of accuracy and the smaller the count value is, the higher the likelihood degree information is.

Moreover, the sub-information transmitting/receiving unit 13 acts as a means for transmitting the internal timing signal and the internal count value multiplexed with the multiplexing unit 19 as the mobile station sub-information. In addition, the sub-information is received from the other station and this sub-information is divided into the external timing signal and the external count value with the demultiplexing unit 20. The external timing signal is transferred to the selector 21, while the external count value is transferred to the comparing unit 18. The comparing unit 18 outputs the select signal for controlling the selector 21 by acting as a means for comparing the internal count value and the external count value. Namely, the timing signal having the higher likelihood degree (high reliability) is selected by comparing the likelihood degrees of the internal timing signal and the external timing signal.

In addition, the TDD transmitting/receiving control unit 14 acts as a means for controlling the transmission and reception of information between the transmitting/receiving information-processing unit 15 and the main information transmitting/receiving unit 11 with the selected transmission-timing signal in accordance with the TDD system. Namely, this control unit 14 transmits and receives the information to and from the other station in the transmitting and receiving period assigned to the mobile station, and also transmits and receives the information to and from the fixed station in the other period. The transmission-timing signal to be inputted to this TDD transmitting/receiving control unit 14 is the internal timing signal or the external timing signal to be selectively outputted by the selector 21. As explained above, the comparing unit 18 compares the internal count value and the external count value and controls the selector 21 to input the timing signal having the higher likelihood degree of the smaller count value to the TDD transmitting/receiving control unit 14 because the likelihood degree of the timing signal of the smaller count value is higher.

Moreover, the main information transmitting/receiving unit 11 includes a frequency selector which acts as a means for selecting a frequency channel, for example, through application of the CSMA system explained above, enabling complete reception of the transmitting information of the fixed station and the other mobile stations and radio communication among mobile stations or with the fixed station on the basis of the destination information or the like included in the transmitting information. Moreover, the sub-information transmitting/receiving unit 13 also includes a radio communication control structure similar to that of the main information transmitting/receiving unit 11. The fixed station not illustrated is provided with a structure similar to that of the mobile stations 1-1, 1-2 and includes a structure similar to the time information acquiring unit 12 for acquiring high precision time information by seizing the GPS satellite group, and a structure similar to the sub-information transmitting/receiving unit 13 for transmitting the sub-information including the internal timing signal and the internal count value. The count value of the fixed station in such a case is usually zero (0), indicating that the timing signal has a high likelihood degree, namely high accuracy (reliability).

FIGS. 2(A), 2(B) and 2(C) are diagrams, which are used to summarize transfer of the transmission-timing signal with respect to the time information and switching of the communication period. In FIG. 2(A), the schematic relationship between the fixed station 30 and a plurality of mobile stations 31-1, 31-2, 31-3, . . . is illustrated. In FIG. 2(B), the relationship between the communication period T1 of the fixed station 30 in accordance with the TDD system, and the communication period T2 of the mobile stations are illustrated. In FIG. 2(C), the communication period T of the mobile stations which is separated from the service area of the fixed station 30 is illustrated. The communication periods T2, T among the mobile stations corresponds to a condition in which a plurality of frequency channels are used and a collision-free frequency channel can be selected by applying the CSMA system. Accordingly, radio communication among the mobile stations in accordance with the number of frequency channels, can be realized. Moreover, in the communication period T1 between the fixed station 30 and mobile stations, various multiplex communication systems can be applied. Radio communication interference among the mobile stations on the radio communications between the fixed station 30 and the mobile stations 31-1, 31-2 can be avoided by setting T1=T2 (T=T1+T2), as illustrated in FIG. 2(B), as the TDD slot and realizing the high precision switching control of the TDD slot timing with the mobile station which has moved to the service area of the fixed station 30.

In addition, the mobile stations 31-1, 31-2 are moving into the service area of the fixed station 30 and the other mobile stations 31-3, 31-4, 31-5, . . . are outside of such service area. However, if the other mobile stations are in the distance enabling radio communications among these mobile stations, the TDD slot timing can be acquired through synchronization with the system clock of the fixed station 30 even though the mobile stations 31-1, 31-2 cannot acquire the time information from the GPS satellite. Namely, since the fixed station 30 transmits the sub-information including the transmission timing signal and count value as the time information, the mobile stations 31-1, 31-2 receive the sub-information from the fixed station 30. In this case, since the count value is equal to a minimum value 0, the transmission timing signal from the fixed station 30 is selected and is then inputted to the TDD transmitting/receiving control unit 14. As a result, the transmission timing synchronized with the system clock of the fixed station 30 can be obtained.

Moreover, the fixed station 30 is located at a position to seize four or more GPS satellites to conduct the TDD control by acquiring high precision time information. Under the condition that the mobile stations 31-1, 31-2 are moving into the service area of the fixed station 30 as illustrated in FIG. 1, the mobile stations 31-1, 31-2 are also capable of acquiring the high precision time information like the fixed station 30 with the time information acquiring unit 12 (refer to FIG. 1) by seizing the four or more GPS satellites. In the fixed station 30 and mobile stations 31-1, 31-2 under the condition explained above, the count value of the counter 17 indicates 0, because the transmission timing signal can be generated by acquiring high precision time information.

Moreover, the mobile stations 31-3, 31-4, . . . are in the outside of the service area of the fixed station 30 and in the condition that the counters 17 of these mobile stations are counting up. Moreover, each mobile station, for example, the mobile station 31-3, is capable of receiving the transmission timing signal and count value as the sub-information from the mobile station 31-2 within the state of distance for enabling mutual radio communications. In this case, since the external count value received from the mobile station 31-2 is smaller than the internal count value, the external timing signal is selected and it is then inputted as the transmission timing signal to the TDD transmitting/receiving control unit 14. That is, the mobile station 31-3 is capable of inputting the transmission timing signal synchronized with the transmission timing signal of the fixed station 30 to the TDD transmitting/receiving control unit 14 under the condition immediately before entering the service area of the fixed station 30. In addition, the mobile station 314 receives the transmission timing signal and count value as the sub-station from the mobile station 31-3 and selects the transmission timing signal having a smaller value by comparing, in the same manner, the internal count value with the external count value.

The count value as the precision information of the transmission timing signal is reset to 0 when the transmission timing generating unit 16 generates the internal timing signal and the count value of the counter 17 is counted up when the external timing signal is selected. However, when the time information cannot be acquired with the time information acquiring unit 12 and when the external count value received from the mobile station count value is smaller, it is also possible to realize control so that the external timing signal is selected, the count value of the counter 17 is updated to the external count value, and the transmission timing generating unit 16 is formed to be synchronized with the external timing signal. As a result, the sub-station includes the updated count value and the internal transmission timing signal synchronized with the external timing signal. With the control explained above, the mobile station is capable of receiving the external timing signal which has a higher accuracy as it gets closer to the service area of the fixed station 30. When the mobile station has moved into the service area of the fixed station, it can realize execution of the TDD control in synchronization with the system clock of the fixed station 30.

If a mobile station cannot acquire high precision time information, it is difficult to acquire the TDD slot timing in the service area of the fixed station. As a result, radio communication among the mobile stations in the area near the service area of the fixed station will impede radio communications between the fixed station and the mobile stations. However, a mobile station in the area near the service area of the fixed station is capable of receiving the timing signal and count value based on the sub-information from the mobile station in the service area, determining accuracy of the timing signal through comparison of the count values, and selecting the timing signal of higher precision based on the smaller count value. Accordingly, when the mobile station moves into the service area, the TDD control becomes possible because of the higher precision timing signal so that interference with communications is avoided.

What is claimed is:

1. A mobile radio system for controlling a radio communication period between a fixed station and a plurality of mobile stations, and a radio communication period among mobile stations in accordance with TDD (Time Division Duplex) system, each of said fixed station and said mobile stations comprising:

time information acquiring means for acquiring external high precision time information;

transmission timing generating means for generating a transmission timing signal in accordance with said TDD system from the time information acquired by said time information acquiring means;

a counter performing a count-up operation with a period of at least the transmission timing signal and being reset when the time information is acquired by said time information acquiring means;

sub-information transmitting/receiving means for transmitting sub-information in which the transmission timing signal generated by said transmission timing generating means is defined as an internal timing signal and the count value of said counter is defined as an internal count value, and for receiving sub-information in which the transmission timing signal of another station is defined as an external timing signal and the count value of the counter of another station is defined as an external count value; and TDD transmitting/receiving control means for controlling the internal timing signal and the external timing signal with one of the timing signals being selected based on a comparison of the internal count value and the external count value.

2. The mobile radio system according to claim 1 further comprising:

comparing means for comparing said internal count value with said external count value;

said TDD transmitting/receiving control means for selecting, with said comparing means, the internal timing signal when the internal count value is smaller than the external count value, and selecting the external timing signal when the external count value is smaller than the internal count value; and main information transmitting/receiving means for being controlled based on the timing selected by said TDD transmitting/receiving control means.

3. A mobile radio control method for controlling a radio communication period between a fixed station and a plurality of mobile stations and a radio communication period among mobile stations in accordance with a TDD system, comprising:

both the fixed station and the mobile stations acquiring the same external high precision time information to generate a transmission timing signal and resetting a counter for a counting operation with at least the transmission timing signal period when the time information is acquired; and defining the count value of the counter as the internal count value, the transmission timing signal generated from the time information as the internal timing signal;

transmitting the internal count value and the internal timing signal with sub-information;

receiving the external count value and the external timing signal with the sub-information;

comparing the internal count value with the external count value; and selecting the timing signal corresponding to the smaller count value.

4. The mobile radio control method according to claim 3, further comprising switching over the communication period in accordance with a CSMA (carrier sense multiple access) system among the mobile stations and the communication period between the fixed station and the mobile stations on the basis of a TDD system synchronized with the transmission timing signal.

\* \* \* \* \*